United States Patent Office 3,369,466
Patented Feb. 20, 1968

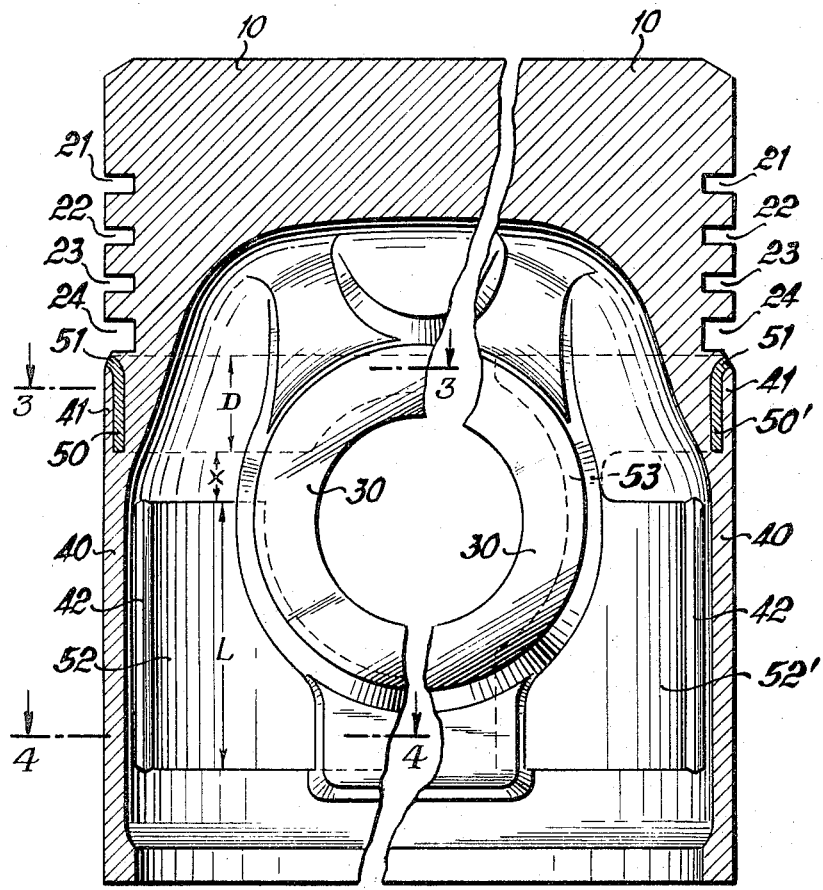

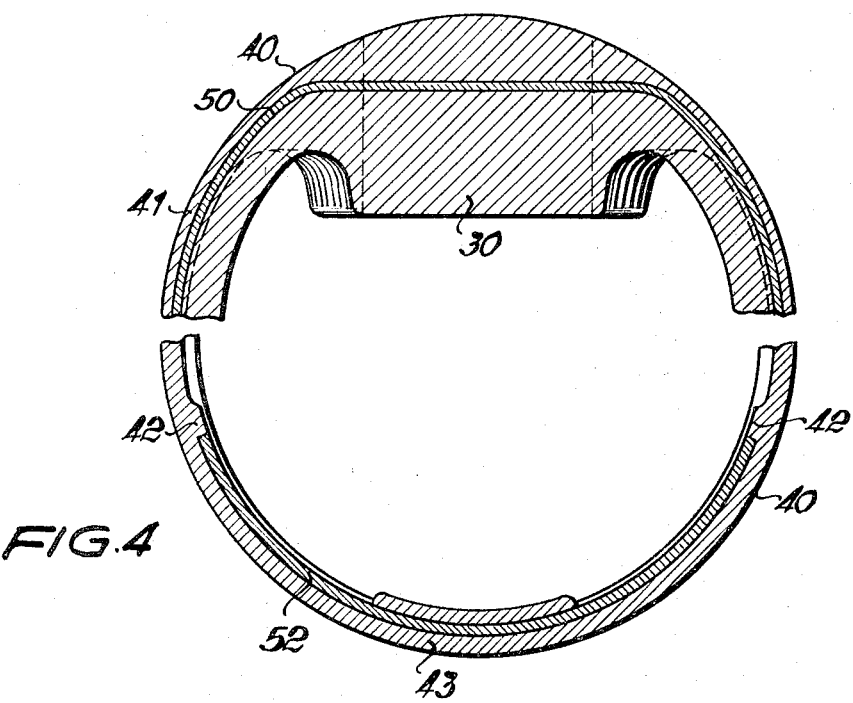

3,369,466
LIGHT METAL PISTON
Rudolf Maier, Stuttgart-Weilimdorf, and Werner Gessinger, Kornwestheim, Germany, assignors to Mahle Komm.-Ges., Stuttgart-Bad Cannstatt, Germany
Filed Dec. 22, 1965, Ser. No. 515,599
Claims priority, application Germany, Jan. 23, 1965, M 63,902
7 Claims. (Cl. 92—229)

ABSTRACT OF THE DISCLOSURE

In a light metal piston having a skirt joined over its entire circumference to the ring zone of the piston head, the radial heat expansion of the skirt is controlled by two differently shaped inserts having a lower coefficient of expansion. Ring members are inserted at the top of the skirt and partial cylindrical elements line portions of the interior of the skirt. The upper edge of the ring member is exposed through the outer surface of the skirt to reduce the flow of heat from the piston head to the skirt.

---

This invention relates to a light metal piston and, in particular, to a piston for an internal combustion engine such as a diesel engine. This invention is further directed to a piston which has a piston head including a piston ring zone and a piston skirt into which is cast a metal insert having a lower coefficient of expansion than the skirt metal and which has its outer circumferential surface completely covered by the skirt metal.

Such a piston, in general, is shown in the U.S. patent to Pope, No. 1,750,429. Pope discloses a piston in which a first metal ring is cast into the piston skirt where it joins the piston head and a second metal ring cast in the skirt adjacent its lower open end, these rings being for the purpose of regulating the expansion of the skirt. The first metal ring is positioned in the top of the skirt where it joins the piston head and where the bottom ring groove is at the top of the skirt. This construction separates, by means of the metal ring, the piston head from the piston skirt and consequently the expansion of the skirt under heat is unaffected by the heat of the piston head and the metal ring is just as effective as if the skirt had been separated from the head by transverse slots. The second metal ring at the bottom of the skirt does not have such a good effect, and the portion of the skirt lying between the first and second ring does not receive the full benefit of expansion control by the rings, and so at which portion the piston skirt is provided with longitudinal slots for relieving the expansion force in the skirt.

Assuming that, instead of using two separate metal ring inserts, metal cylindrical segments are used which extend along the entire longitudinal length of the skirt, a uniform and effective control is still not obtained. To the contrary, the expansion controlling effect decreases unexpectedly and rather rapidly toward the bottom open end of the skirt.

The object of this invention is to produce a piston structure of the general type disclosed above and in which a uniform control of the heat expansion is obtained along the entire longitudinal length of the skirt.

In general, in this invention, such a uniform thermal expansion control is obtained by means of a first annular metal insert, which may be composed of two segments, which is embedded in the upper end of the piston skirt where it joins the piston head and which separates the skirt metal on the outer circumference of the skirt from the piston head at least within the range of the adjacent skirt surfaces, together with second cylindrical elements which are positioned in the middle portion of the skirt and which are separated from each other and have their inner wall surfaces exposed to the interior of the piston skirt.

In this construction, it is preferred that the longitudinal length of the first ring member be less than the longitudinal length of the second cylindrical elements and that the first ring member be not longer than one-fifth of the length of the piston skirt.

The distance between the first ring member and the second cylindrical element preferably is as small as possible and at least less than the length of the first ring member.

In order to simplify the casting installation of the first ring member and the second cylindrical element in the mold for the piston, a design is used in which the ring member and cylindrical element are joined by skirt struts extending in the vicinity of the piston pin bosses.

It is also preferred to provide the first ring member, which is either a complete ring or two ring segments, with an outwardly turned upper edge portion which is inclined toward the outer circumference of the skirt adjacent the piston head. The outer edge of the outwardly turned flange portions extend to a chamfered edge on the skirt portion adjoining the lowermost ring groove in the piston head.

By reason of this construction, the lowermost ring grooves in the piston head do not have to be slotted as required in the piston of Patent No. 1,750,429. However, the light metal of the piston skirt lying on the first control ring member is substantially separated from the piston head and even more so when the flanged edge of the first ring member is exposed to the outer surface of the piston, and therefore the skirt is not expanded by heat produced in the piston head. Also, the ring member is desirably strengthened by the outwardly turned edge portion at the upper end of the skirt.

The means by which the objects of the invention are obtained are described more fully with reference to the accompanying drawings, in which:

FIGURE 1 is a longitudinal cross-sectional view through the piston of this invention;

FIGURE 2 is a similar view of a modified form of the invention;

FIGURE 3 is a cross-sectional view taken on the line 3—3 of FIGURE 1; and

FIGURE 4 is a cross-sectional view taken along the line 4—4 of FIGURE 1.

As shown in FIGURE 1, the piston composed of a light metal such as aluminum has a piston head 10 including an annular ring zone provided with piston ring grooves 21, 22 and 24. The piston also includes wrist pin bosses 30 and a skirt 40.

In FIGURES 1, 3 and 4, the skirt 40 is uninterruptedly joined to piston head 10, and at the jointure a ring member 50 composed, for example, of sheet steel is cast on the upper end portion of the piston skirt so that its outer circumferential surface is completely covered by a layer of light metal 41 so that this layer is an integral part of the skirt. Ring member 50 has an outwardly curved and inclined upper edge portion 51 which ends in a chamfered edge immediately below the piston ring groove 24. Such separates the light metal layer 41 from the piston head 10. After the piston has been cast and cooled, layer 41 shrinks on member 50 so that a tensile stress is formed in layer 41. When the piston is used in an engine and thus reheated up to operating temperature, this tensile stress and accordingly the thermal expansion of layer 41 is reduced so that the radial thermal expansion of the heated layer 41 is only slightly greater than that of the ring member 50. The thermal expansion of layer 41 is not controlled by the heat from piston head 10 even though the skirt 40 and piston head 10 are formed in one piece. The length D of the ring member 50 is less than one-fifth of the length of the skirt 40. The inner circumferential surface of member 50 is completely covered with the light metal of the skirt and thus is not exposed to the interior of the skirt.

In approximately the middle portion of the skirt below ring member 50 are cylindrical segment inserts 52 which have a length L which is approximately equal to one-half of the length of the skirt 40 and are separated from the ring member 50 by a distance X which is of less length than the distance D. The cylindrical elements 52 are cast in the piston skirt and are spaced from each other and anchored in the wrist pin bosses 30 as well as in the ribs 42 extending longitudinally in the skirt. The pair of elements 52 have the major portion of their inner circumferential surfaces exposed to the interior of the skirt 40. Elements 52 together with the corresponding skirt portions 43 lying outwardly of elements 52 form bimetallic connecting members which undergo thermal expansion when heated and therefore diminish the radial expansion of the skirt over substantially its entire length.

The overlapping effect of the ring members 50 and the cylindrical elements 52 is that the radial expansion of the skirt is satisfactorily controlled over the entire length of the skirt. Also, in pistons having cylindrical inserts extending along substantially the entire length of the skirt and over the complete circumferential area thereof and used with the ring members 50, the heat of the piston head is not transferred to the piston skirt and the flow of heat from the skirt to the cylinder wall is substantially uniform so that the skirt remains cool.

In the modification of FIGURE 2, the construction differs from FIGURE 1 only in that, instead of a complete annular ring member 50, there are two ring member segments 50', each of which has its ends anchored in the wrist pin bosses 30, and that, instead of a pair of cylindrical elements 52, four cylindrical segments 52' are used, each having its ends terminating within the range of the wrist pin bosses 30 and which are connected by struts 53. The overall effect is not substantially influenced by these structural changes because the skirt portions between the ends of the ring members 50' and the struts 53 lie in the relatively stiffened portions provided by the wrist pin bosses 30.

Having now described the means by which the objects of the invention are obtained, we claim:

1. In a light metal piston for an internal combustion engine comprising a piston head including a piston ring zone, an unslotted piston skirt uninterruptedly joined over its entire circumference to said ring zone, at least a partial ring member composed of a metal having a lower coefficient of expansion than that of said skirt embedded in the skirt portion adjoining said piston head, and at least partial cylindrical elements secured to the interior wall of said skirt and having a lower coefficient of expansion than that of said skirt, the improvement in which said ring member has its upper edge exposed through the outer surface of said piston and the inner and outer circumferential surfaces of said ring member are wholly covered by said skirt, and said cylindrical elements are positioned in the middle interior portion of said skirt and spaced from each other and have their inner circumferential surfaces exposed to the interior of said skirt.

2. In a piston as in claim 1, said ring member having a length less than that of said elements.

3. In a piston as in claim 2, said ring member having a length less than one-fifth of the longitudinal length of said skirt.

4. In a piston as in claim 3, said elements being separated from said ring member a distance which is less than the length of said ring member.

5. In a piston as in claim 4, further comprising ring pin bosses in said skirt, and skirt struts extending between said ring member and said elements adjacent said bosses.

6. In a piston as in claim 5, said ring member having an outwardly turned edge portion inclined toward the skirt portion adjoining said piston head.

7. In a piston as in claim 6, further comprising a piston ring groove in said piston ring zone adjacent said skirt portion, a chamfered edge on said skirt portion adjoining said groove, and said ring member having the edge of its outwardly turned edge portion exposed through said chamfered edge.

References Cited

UNITED STATES PATENTS

| 1,478,561 | 12/1923 | Faessel | 92—225 X |
| 1,750,429 | 4/1930 | Pope | 92—229 |
| 1,842,745 | 1/1932 | Butler | 92—229 X |
| 2,715,052 | 8/1955 | Jardine | 92—229 |
| 3,183,796 | 5/1965 | Christen et al. | 92—229 |
| 1,847,947 | 3/1932 | Jardine | 92—229 |
| 2,024,958 | 12/1935 | Wagner | 92—229 |
| 2,248,175 | 7/1941 | Jardine | 92—230 |

FOREIGN PATENTS

| 701,291 | 12/1953 | Great Britain. |
| 851,849 | 10/1960 | Great Britain. |

MARTIN P. SCHWADRON, *Primary Examiner.*

G. N. BAUM, *Assistant Examiner.*